UNITED STATES PATENT OFFICE.

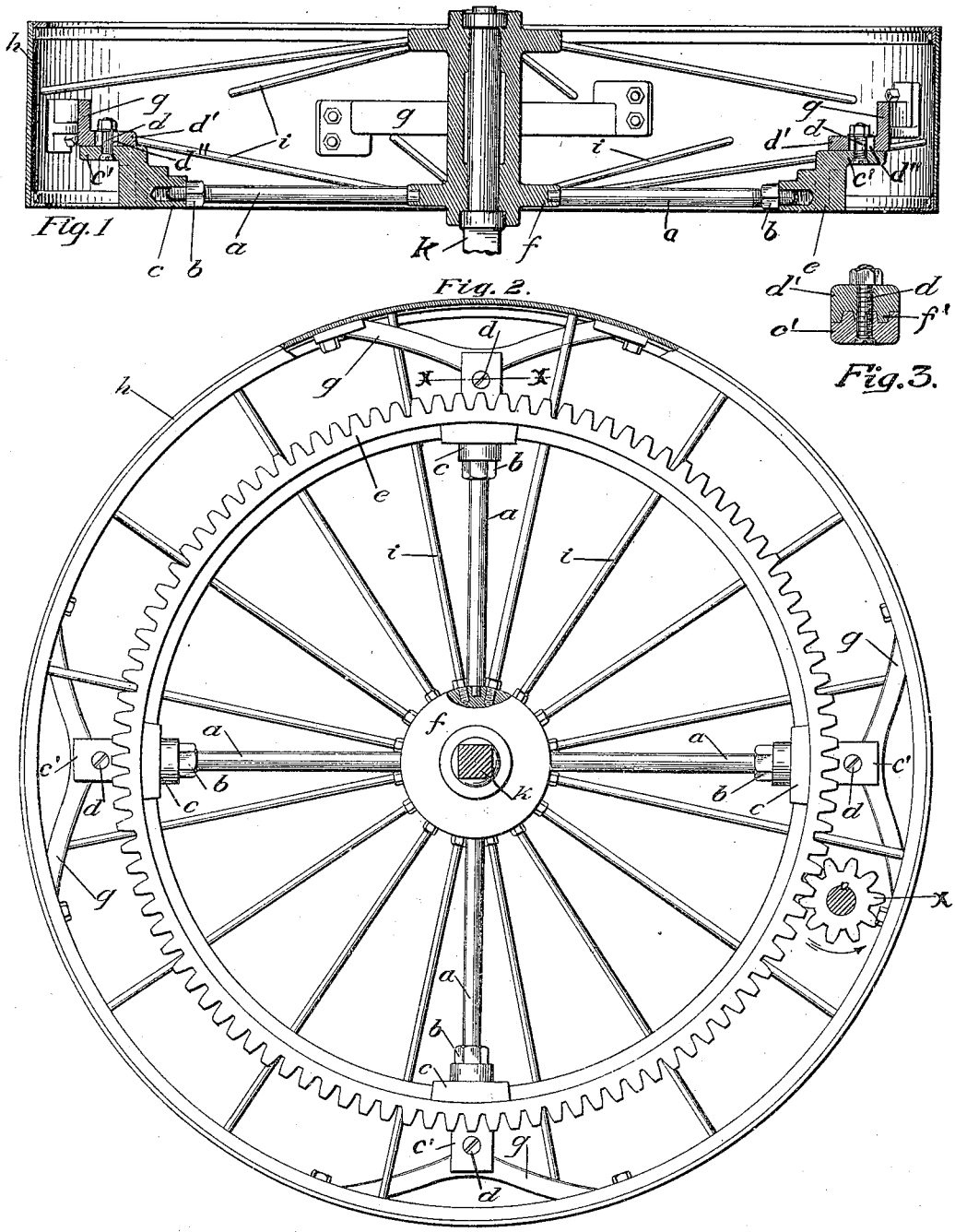

GEORGE T. STRITE, OF MINNEAPOLIS, MINNESOTA, ASSIGNOR TO GAS TRACTION CO., OF MINNEAPOLIS, MINNESOTA.

DRIVE-WHEEL.

953,356.  Specification of Letters Patent.  Patented Mar. 29, 1910.

Application filed March 13, 1909. Serial No. 483,167.

*To all whom it may concern:*

Be it known that I, GEORGE T. STRITE, of Minneapolis, Hennepin county, Minnesota, have invented certain new and useful Improvements in Drive-Wheels, of which the following is a specification.

My invention relates to drive wheels and particularly those used on a traction engine.

The object of my invention is to apply the traction at the rim of the wheel and from the outer circumference of the bull gear, thus relieving the gear, hub and spokes of unnecessary strain.

A further object is to provide means for easily and quickly centering the bull gear with respect to the hub of the wheel.

My invention consists generally in various constructions and combinations, all as hereinafter described and particularly pointed out in the claims.

In the accompanying drawings, forming part of this specification, Figure 1 is a horizontal, sectional view through a drive wheel with my invention applied thereto. Fig. 2 is a side elevation, partially in section. Fig. 3 is a detail, sectional view on the line X—X of Fig. 2, illustrating a modified means for securing the gear to the rim of the wheel.

In the drawing, $a$ represents the centering spokes having lock nuts $b$ and threaded ends fitting within the blocks $c$. The inner ends of the spokes are supported in the hub $f$, which has a box for the axle $k$. The blocks $c$ are formed on a gear ring $e$ and said gear ring has an outwardly projecting flange $c'$ that is arranged to contact with an inwardly projecting flange $d'$ provided on a bracket $g$, that is secured at its ends to the rim $h$ of the wheel. There may be any suitable number of centering spokes and brackets $g$, but I have shown four of them herein. Bolts $d$ pass through the flanges $c'$ and $d'$ and the hole in the flange $c'$ is threaded to receive the bolt and prevent it from working endwise into the path of the pinion in case its lock nut should work loose. Spokes $i$, extend from each end of the hub out to the rim, as indicated in the figures. Instead of having the meeting surfaces of the flanges $c'$ and $d'$ flat, they may be provided with teeth or corrugations $f'$, as indicated in Fig. 3. With this construction, the bull gear $e$ can be easily and quickly centered with respect to the axis of the hub and the driving strain will be thrown outwardly to the rim of the wheel. It will also be noted that the hole or slot $d''$ in the flange $d'$ is considerably larger than the bolt $d$, thus allowing a slight movement of the gear in case the wheel strikes an obstruction and eliminating all danger of damage to the gear at such time.

$x$ represents the driving pinion meshing with the teeth of the gear $e$. This gear, as plainly shown in Fig. 1, is located between the spokes of the wheel and the inner face of the wheel, where the power can be applied through the pinion to the gear ring and from thence transmitted to the middle of the wheel rim.

In casting a drive gear with the spokes and hub it has been found extremely difficult, if not impossible, to obtain a casting which will not twist or warp in cooling, owing to the difference in the amount of metal in the ring and the spokes. Evidently there is considerable advantage in bringing the gear ring near the rim of the wheel and in wheels eight and nine feet in diameter, such as are used on traction engines, it becomes very important to provide some means which will enable the gear ring to be cast independently and without the usual integral spokes and quickly and accurately centered with respect to the hub. This end I have attained by means of the centering spokes which form an important feature of this invention. I do not wish, however, to be confined to the means shown for mounting these spokes in the hub or in the ring, as various forms of connections may be devised for this purpose, my object being to provide some form of adjustment which will be easily operated and accurate.

I claim as my invention:

1. A drive wheel, comprising a rim, a hub therefor, spokes between said hub and rim, a gear ring, and means radiating from said hub and connected to said ring whereby the said ring may be centered with respect to the hub.

2. The combination, with a drive wheel rim, its hub and spokes, of a gear ring, spokes connecting said hub and said ring, and means for adjusting said spokes to center said ring.

3. A drive wheel, comprising a rim, a hub therefor and spokes, a gear ring, and means radiating from said hub in the plane of said gear ring and whereby it may be centered with respect to said hub.

4. A drive wheel, for a traction engine, comprising a rim, a hub therefor, and a series of spokes connecting the ends of said hub with said rim, a gear ring located between said spokes and the inner face of said wheel, means connecting said ring with said rim, means for centering said ring with respect to said hub, and a driving pinion interposed between said rim and ring and meshing with the teeth of said ring.

5. A wheel comprising a rim, a hub therefor, spokes connecting said hub with said rim, a gear ring, centering spokes mounted at one end in said hub and having adjustable connections at their other ends with said ring, and a driving pinion meshing with said ring.

In witness whereof, I have hereunto set my hand this 9th day of March 1909.

GEORGE T. STRITE.

Witnesses:
C. G. HANSON,
RICHARD PAUL.